Dec. 2, 1924.

J. C. MacLACHLAN ET AL 1,517,445

PROCESS OF PRODUCING POWDERED MEAT

Filed Aug. 11, 1922   2 Sheets-Sheet 1

INVENTORS.
JOHN C. MACLACHLAN.
JOHN M. MACLACHLAN.
BY THEIR ATTORNEY.
James F. Williamson Dec. 2, 1924.  
J. C. MacLACHLAN ET AL  
1,517,445  
PROCESS OF PRODUCING POWDERED MEAT  
Filed Aug. 11, 1922  2 Sheets-Sheet 2
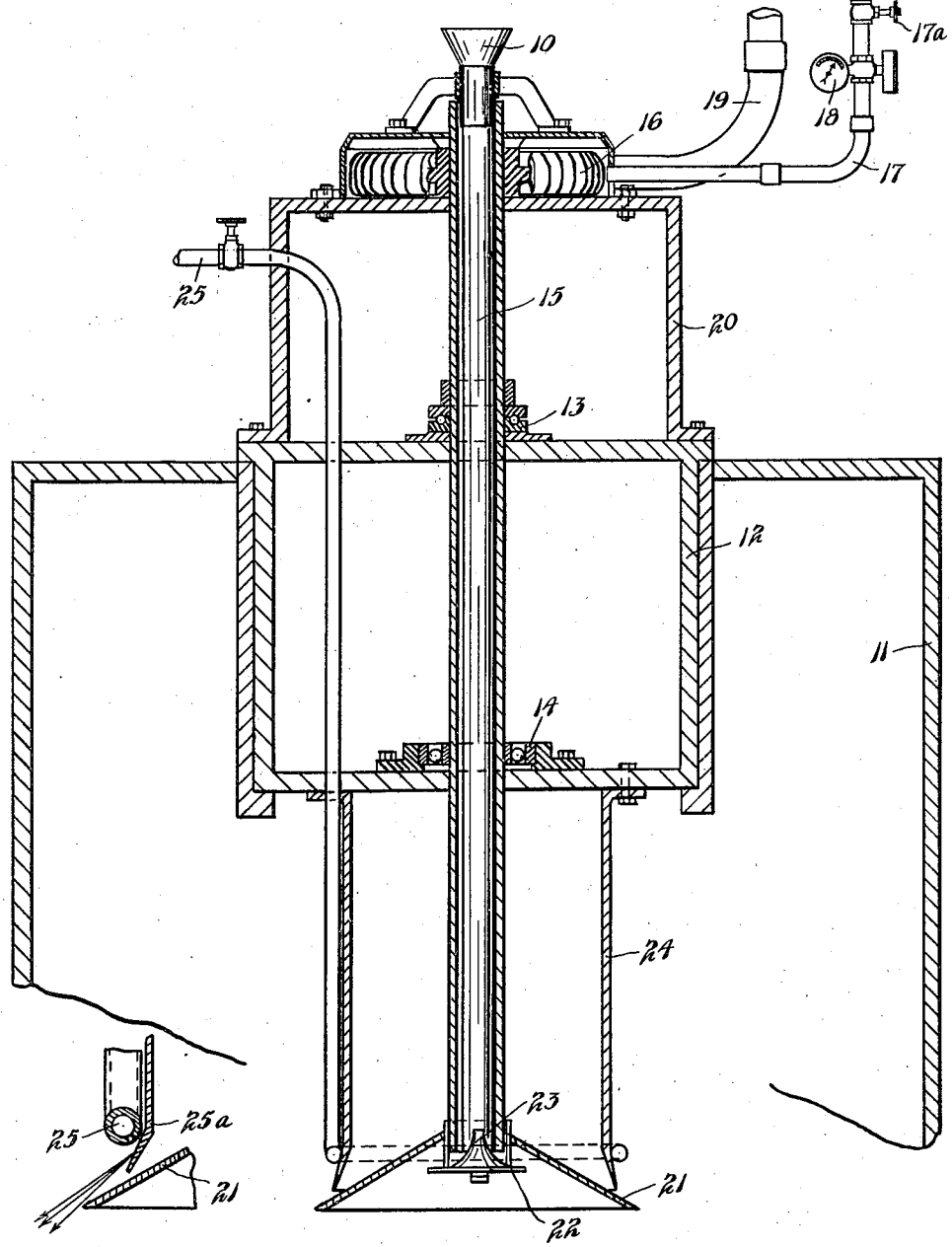
INVENTORS  
JOHN C. MACLACHLAN.  
JOHN M. MACLACHLAN.  
BY THEIR ATTORNEY.  
James F. Williamson Patented Dec. 2, 1924.

1,517,445

UNITED STATES PATENT OFFICE.

JOHN C. MacLACHLAN, OF ST. PAUL, MINNESOTA, AND JOHN M. MacLACHLAN, OF MILWAUKEE, WISCONSIN.

PROCESS OF PRODUCING POWDERED MEAT.

Application filed August 11, 1922. Serial No. 581,056.

*To all whom it may concern:*

Be it known that we, JOHN C. MACLACHLAN and JOHN M. MACLACHLAN, citizens of the United States, residing at St. Paul and Milwaukee, in the counties of Ramsey and Milwaukee and States of Minnesota and Wisconsin, have invented certain new and useful Improvements in Processes of Producing Powdered Meat; and we do hereby declare the following to be a full, clear, and exact description of the invention, such as will enable others skilled in the art to which it appertains to make and use the same.

This invention relates to the process of producing powdered meat. While many attempts have been made to prepare foods from meat, these prepared foods have generally been of such character that they have very small nutritive properties. Such foods include beef extracts and beef juices. Such meat products contain a large per cent of the salts found in the meat together with a large part of the extractives, a small quantity of fat and a very small proportion of soluble proteids. Experiments have proven that such preparations have very little food value and are only useful to a practical extent in stimulating the flow of the digestive secretions. Such products therefore are very ill fitted as food for sick or convalescing patients, as these products cannot be taken in sufficient quantities to supply the necessary nutrition. In order to secure the necessary nutritive substances in the meat product it is necessary to retain therein the solid constituents of the meat. Ordinarily, meat contains about seventy-five per cent of water and twenty-five per cent of solids. Any successful attempts to obtain a nutritive matter of meat in a small bulk must, therefore, be based upon the removal of a part at least of the water which it contains. If all of the water were removed the composition of the solid product would be approximately of the following:

|                          | Per cent. |
|--------------------------|-----------|
| Proteids and albuminoids | 86.8      |
| Extractives              | 7.8       |
| Mineral matter           | 5.4       |

Beef powders have actually been prepared by simply drying the meat and thus retaining all of such solid substances and such beef powders have been found to contain exceedingly high nutritive properties.

It has been found that in the use of dry powdered meats in hospitals for the sick and convalescing patients, that when the said powder is used to make beef broth or tea, the fine or ground particles of meat tend to stick in the throat or they, at least, produce a sensation of roughness in the throat as though the substance contained grit. For this reason these products have been criticized by doctors and dietitians in hospitals and other places and have found disfavor with the patients.

It is an object of this invention to so improve the process of producing dry powdered meat that not only will the nutritive properties of the meat be retained, but the fiber of the meat will be disintegrated to such a high degree that the above mentioned disagreeable effect will be eliminated when the powder is used in making broths or teas.

In accordance with the invention herein disclosed, the preferably raw meat is first reduced to a finely ground condition similar to that of meat used in making sausages or frankfurters. The meat is then diluted to a fluid or semifluid consistency and while in this state is still further disintegrated in a machine of the milling type so that the fiber is reduced to an exceedingly fine state and thoroughly disintegrated. After the fiber has thus been reduced to an exceedingly fine pulp the product is dried by any of the well known process, but preferably by spraying the same centrifugally in the presence of a hot drying medium.

This and other objects and advantages of the invention will be apparent from the following description made in connection with the accompanying drawings which illustrate, diagrammatically, one form of apparatus which can be used to carry out the herein disclosed process.

Referring to the drawings,

Fig. 2 represents a vertical section of a spraying device used in the drying step; and Fig. 3 is a view on an enlarged scale of a portion of the device shown in Fig. 2.

Figure 1:
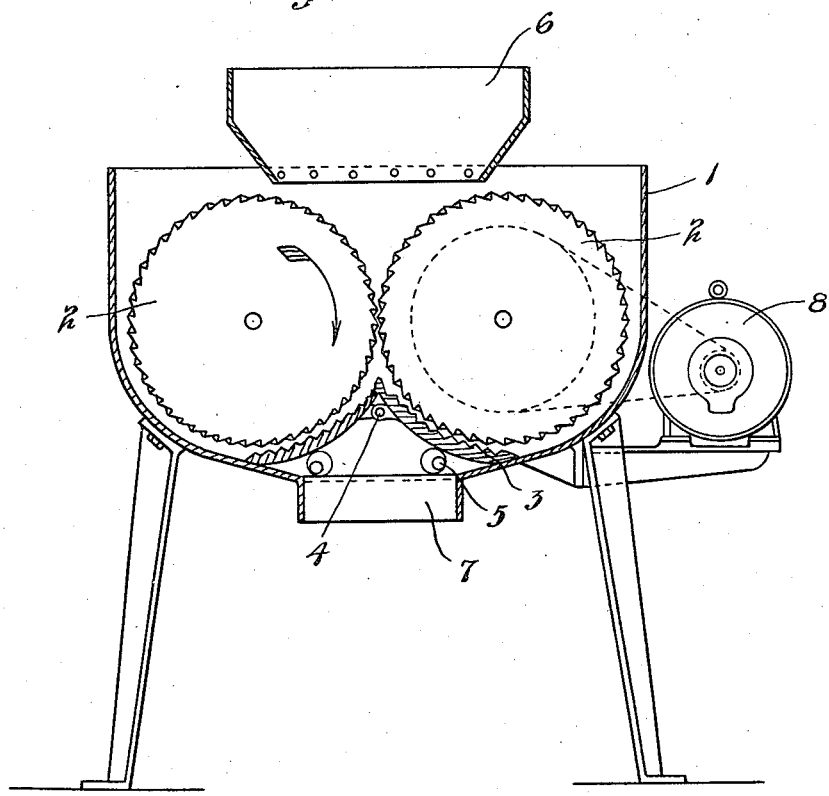
Fig. 1 represents more or less diagrammatically a vertical section of a grinding or milling machine used to disintegrate or pulp the mixture of water and meat.

In carrying out the process, the lean meat is first ground in an ordinary meat grinding or sausage machine to a finely ground condition. This condition of the meat, as stated above, is approximately that of meat usually used in making sausages of various kinds. Any well known form of meat grinding machine can be used in this step and it is thus unnecessary to illustrate any specific form of apparatus therefor. After the meat has thus been initially ground, it is mixed with water or other liquid to dilute the same to a fluid or semi-fluid consistency, so that the same will flow through a pipe. This fluid or semi-fluid substance is then delivered to a pulping or disintegrating machine. This machine is generally of the type used in milling operations and one form of such an apparatus is illustrated in Fig. 1. The machine comprises a suitable main receptacle 1 in which are journaled a pair of fluted or grooved rolls 2 arranged to run very close to each other so that any substance passing therebetween will be cut or ground to a fine condition. If desired, concave members 3 can also be placed in the receptacle 1 adjacent to the rolls 2, which members will be provided with flutes or teeth co-operating with the flutes or teeth on the rollers 2, so that the material will be still further ground between the rolls and concave members. These members 3 are shown as hinged or pivoted at 4 and as arranged for adjustment to and from the rolls 2 by eccentrics 5, it being understood that the members will be held in adjusted position by suitable bolts. The meat will be placed in the machine through a hopper 6 and will be progressed therethrough by the flutes or grooves in the rolls which will be arranged helically thereon and the ground product will be discharged at the other end of the machine through a chute 7. A suitable motor 8 is shown as mounted on the machine for driving the same.

While one particular form of apparatus has been illustrated, for carrying out the pulping or disintegrating step, it will be understood that any suitable form of grinding or disintegrating machine, such as the well known cylinder and shell or cylinder and concave machines, may be used.

After the mixture of ground meat and fluid has been thoroughly pulped and disintegrated the same is ready to be dried and in this condition it is transferred from the pulping machine to a hopper 10 of a drying machine illustrated in Fig. 2. This apparatus comprises a drying chamber of considerable size having the walls 11 and in the top of which chamber is mounted a suitable bearing member 12. This member is provided with thrust and journal bearings 13 and 14, respectively, which are shown as of the ball type. In these bearings is mounted a rotating pipe or conduit 15, connected at its upper end to the rotor 16 of a steam turbine. This turbine is supplied with steam from a steam pipe 17 equipped with the usual regulating valve 17$^a$ and the gauge 18. The exhaust pipe for the turbine is shown as 19. The feeding hopper and pipe 10 of the drying apparatus is mounted on top of the turbine casing which is, in turn, mounted upon an auxiliary casing 20. At its lower end, the conduit 15 has rigidly secured thereto a downwardly flaring or conical member 21 having a plain lower edge. A distributing plate 22 is also secured to the extreme lower end of conduit 15 and has an upstanding conical member 23 disposed thereon and projecting into the lower end of said conduit to form a distributing means therefor. To the lower end of the member 12 a shell 24 is secured and depends with its lower edge in close proximity to the member 21, the said edge being turned outwardly slightly. A steam pipe 25 is disposed along the outside of the shell 24 and terminates in a ring surrounding said shell adjacent to its outwardly flaring end. This steam pipe is provided with a large number of perforations 25$^a$.

In the drying operation, the material is, as stated, charged into the member 10 and passes into the conduit 15. This conduit is revolved at exceedingly high speed by the turbine rotor 16. This turbine is of the De Laval or other high speed steam turbine type. It has been found that a steam turbine is a very efficient driving means for such a separating device, as the pressure of the steam can be maintained constant by the regulating valve 17$^a$ and also by an automatic valve used in connection with the guage 18. With a constant pressure, the speed of the turbine is substantially constant and maintained at a large number revolutions per minute. The fluxations in speed of electric motors due to variations in the current is thus avoided. The material passes down the conduit 15 and is distributed onto plate 22 by the member 23 and from this plate, is thrown outward again to the inner walls of the flaring member 21. The material is distributed on and moves to the bottom of the member 21 and is projected outwardly in an umbrella-like shower at high velocity. The steam entering pipe 25 issues from the perforations 25$^a$ at high velocity and is deflected, as shown by the arrows in Fig. 3, downwardly around the edge of member 21. This steam acts to impact and separate the particles of the pulp and at the same time to dry the same. A circulation of warm or hot air is maintained in the drying chamber and the material projected outwardly by the drying apparatus is dried almost simultaneously and falls to the bottom of the chamber in the form of a dry and very fine powder.

While specific apparatus has been illustrated by which the process can be carried out, it will be understood that the same may be practiced by the use of various forms of apparatus, that illustrated being merely one of such forms.

By mixing of the ground meat with water, and the subsequent pumping and disintegrating operation, the soluble substances in the meat which include principally the juices, inorganic salts and flavoring substances, will, of course, be dissolved. During the drying operation, the liquids will be evaporated from the soluble substances and the same will be deposited with the other pulverized parts of the meat at the bottom of the chamber 11. The particles of the pulverized fiber and other insoluble substances will be separated from the particles of the soluble substances but all of these particles will be deposited together and mixed to form homogeneous dry powdered material. The soluble particles will be still in a soluble and uncooked condition and the flavoring qualities of these particles will be unimpaired. When the pulverized meat is used to make a broth or tea, all of the original flavor of the meat will be retained and the taste and flavor of the same will be as though made from the fresh meat.

The product thus formed has been found very satisfactory in preparing broths and tea for invalids and convalescing patients and produces none of the disagreeable effects which have been experienced by powdered meats prepared by previous processes. The product is also of great value for making dressings, for meat gravies, etc., for household use.

It will, of course, be understood that various changes may be made in the duration and arrangement of the various steps without departing from the scope of applicant's invention, which, generally stated, consists in the matter above described and set forth in the following claims.

The particles of meat while in transit in the cabinet are heated sufficiently to be sterilized so that any tendency of the meat to become sour or rancid is eliminated.

What is claimed is:

1. The process of producing dry powdered meat which consists in grinding the meat to a fine condition, diluting the ground meat to a fluid consistency, disintegrating the mixture to a fine pulp and drying the pulp substantially instantaneously to a powdered substance.

2. The process of producing powdered meat which consists in grinding the meat, mixing the ground meat with water to form a fluid, pulping the mixture to disintegrate the fiber of the meat, and then separating and rapidly drying the separated particles of pulp to form a powdered substance.

3. The process of producing powdered meat which consists in grinding the meat, mixing the ground meat with water to form a fluid, pulping the mixture to disintegrate the fiber of the meat, and then separating and drying particles of pulp so to form a powdered substance, the separating and drying step comprising projecting the pulp in a spray in the presence of a hot drying medium.

4. The process of producing a powdered meat which consists in grinding the meat and pulping the ground meat and projecting the same in a shower in hot air to dry the same.

5. The process of producing dry powdered meat which consists in grinding the meat, mixing the same with fluid and pulping the mixture thoroughly to disintegrate the fiber thereof, and centrifugally projecting the pulp in a hot drying medium to form a dry powdered substance.

6. The process of producing dry powdered meat which consists in grinding the meat to a fine condition, diluting the same to a fluid consistency, disintegrating said fluid mixture to a fine pulp, projecting the pulp in a spray in the presence of a hot drying medium and also projecting a blast of steam through said spray to separate and dry the particles of pulp.

7. A powdered meat comprising the insoluble substances of the meat in pulverized or minute particles and the soluble substances of the meat in separate minute or pulverized particles, the particles of the soluble substances being in soluble and uncooked condition and mixed with the particles of the insoluble substances to form a homogeneous dry material.

8. The process of producing powdered meat which consists in grinding the raw meat, mixing the ground meat with water to form a fluid, pulping the mixture to disintegrate the fibre of the meat, then separating, and rapidly drying the separated particles of pulp to form a powdered substance at a temperature sufficiently high to sterilize said particles.

9. A powdered raw meat comprising the fibre in pulverized form, the particles of the fibre being separate from the particles of the soluble portion of the meat, both being uncooked and sterilized.

In testimony whereof we affix our signatures.

JOHN C. MacLACHLAN.
JOHN M. MacLACHLAN.